United States Patent [19]
Caroli

[11] 3,865,359
[45] Feb. 11, 1975

[54] VACUUM APPARATUS

[75] Inventor: Italo Caroli, Westmount, Quebec, Canada

[73] Assignee: DBM Industries Ltd.

[22] Filed: Sept. 5, 1973

[21] Appl. No.: 394,526

Related U.S. Application Data

[63] Continuation-in-part of Ser. Nos. 249,142, May 1, 1972, abandoned, and Ser. No. 286,661, Sept. 6, 1972, abandoned.

[52] U.S. Cl. ................................... 269/21, 294/65
[51] Int. Cl. ........................................... B25b 11/00
[58] Field of Search ............. 269/21; 248/262, 263; 294/64, 65; 29/203 V; 51/235; 279/3

[56] References Cited
UNITED STATES PATENTS

| | | | |
|---|---|---|---|
| 1,631,652 | 6/1927 | Sprenger et al. | 269/21 |
| 2,729,040 | 1/1956 | Wallace et al. | 269/21 |
| 2,782,574 | 2/1957 | Copold | 269/21 |
| 3,335,994 | 8/1967 | Cocito | 248/363 |
| 3,720,433 | 3/1973 | Rosfelder | 294/65 |

OTHER PUBLICATIONS
Western Electric, Technical Digest No. 7, page 17, July 1967, Porous Plug Vacuum Plate, Lockhart et al.

*Primary Examiner*—Roy Lake
*Assistant Examiner*—Neil Abrams
*Attorney, Agent, or Firm*—Stevens, Davis, Miller & Mosher

[57] ABSTRACT

A vacuum apparatus for holding a workpiece in a selected position has a base with a surface against which the workpiece is to be supported, and a surface sheet thereon of resiliently deformable material including an array of openings. Each opening being defined by a resilient wall and being connectible through passage means to a source of sub-atmospheric pressure. A calibrated insert is disposed in each opening to interconnect it and the passage means and being operable at all times to limit flow therethrough to a controlled volume, said calibrated insert having an effective diameter in the range from about 0.001 to 0.010 inch. The controlled volume passed by each calibrated insert having an accumulated total volume not exceeding the volumetric capacity of said source.

7 Claims, 16 Drawing Figures

VACUUM APPARATUS

This application is a continuation-in-part of U.S. application Ser. No. 249,142 of May 1, 1972 now abandoned and application Ser. No. 286,661 of Sept. 6, 1972 now abandoned.

This invention relates to a method and improved apparatus for using a negative pressure to hold a workpiece securely, but releasably in a desired position. More particularly, the invention relates to a vacuum apparatus having flow-constricting means therein to pass only a controlled volume of air therethrough and which is maintained continuously in one operating condition.

BACKGROUND OF THE INVENTION

Prior art vacuum chucks have been proposed with many different constructions. The reader is referred, for example, to earlier vacuum devices illustrated in U.S. Pat. Nos. 3,307,817–819, each of which issued on Mar. 7, 1967 to J. M. Cocito. Other vacuum chucks which are currently available on the market are those manufactured by the O. S. Walker Company, Inc. of Worcester, Massachusetts; or the Thompson Vacuum Company, of Sarasota, Florida. The arrangement in those prior art vacuum chucks required the selective placement of sealing strips into grooves in a configuration conforming generally to the shape of the workpiece; and/or the manipulation or actuation of an on-off valve to close off any air flow therethrough when the valve was in a "pressure chamber" not fully covered by the workpiece. Failure to close off the valve in such prior art arrangements prevented an effective vacuum from being drawn for purposes of holding the workpiece in place. Further yet, such valves had to be closed in order not to overwhelm the volumetric capacity of vacuum pumps or suction fans which might have been used therewith.

SUMMARY OF THE INVENTION

Many disadvantages of prior art vacuum chucks have been reduced significantly, and in some instances eliminated, by the present invention. The method and apparatus contemplated herein, for example, is not restricted in size or shape to anywhere near the same extent as in the prior art. Moreover, the present invention has eliminated the past necessity of manually altering the configuration of sealing means and/or opening or closing of an on-off valve in areas not covered by the workpiece. Further yet, the present invention embodies many specific configurations and lends itself to the handling of workpieces made of either a magnetic or a non-magnetic metal, plastic laminates, wood, glass in sheet form, leather, vinyl or paper sheets, and other such substantially non-porous materials.

The present invention can have many different specific configurations. It can, for example, take the form of a vacuum chuck used in a modern day machine shop. There, a workpiece is held securely in position by the present vacuum apparatus. The workpiece being held is then machined using a milling or boring machine, a drill press, a grinder, or othr such machine tools. In an alternative form, the present invention is embodied in what is known as a "vacuum bed". The area of such a vacuum bed is frequently very large, ranging up to many square feet in surface area. Such an apparatus is used most often in handling workpieces which are in sheet form, in the production of wood veneer, or to blanket and subsequently pick up workpieces of a large size and/or irregular shape when the bed is flexible and resiliently deformable.

The present invention is based on the recognition that, contrary to the teaching of prior art device, a vacuum system need not be substantially air tight in order to function as desired. Applicant has thus recognized that significant advantages can be derived from an arrangement in a vacuum system where passages opening into a vacuum chamber and through which a subatmospheric pressure is to be drawn in that chamber, are deliberately left open to atmosphere through flow-constricting means which pass only a controlled volume of air. In this way sub-atmospheric pressures can be developed and sustained in one or more pressure chambers defined by those bounded zones which are fully covered, irrespective of whether or not other bounded zones are also covered or left open to atmosphere. It is necessary only that the controlled volume passed by all of the flow-constricting means has a cumulative total not exceeding the volumetric capacity of the equipment used to develop the sub-atmospheric pressure.

According to one form of the present invention, therefore, there is provided in a vacuum apparatus for holding a workpiece in a selected position wherein the apparatus has a base with a surface against which the workpiece is to be supported, and sealing means on the surface to define a multiplicity of bounded zones, each bounded zone being connectable through passage means therein to a source of subatmospheric pressure; the improvement comprising a flow-constricting means disposed to interconnect the bounded zone and passage means, and being operable at all times to limit flow therethrough to a controlled volume. The controlled volume of flow is in the range from about 0.01 to about 0.02 cubic foot per minute as measured at a pressure differential of 27 inches of mercury. The accumulated total volume passed by each flow-constricting means does not exceed the volumetric capacity of the source of sub-atmospheric pressure.

As used herein, the flow constricting means envisages a number of different specific forms. In one preferred embodiment, the flow-constricting means comprises a plug of porous material having a mean pore size not exceeding approximately 15 microns, and more preferably comprising an insert of sintered porous stainless steel whose mean pore size is in the range from about 5 to 10 microns. The plug of porous material can be disposed directly in the passage means which opens into each bounded zone; or preferably, the plug of porous material comprises an insert disposed in a tube-like threaded stud or sleeve which is adapted to be threaded or press fitted, respectively, into such passage means.

In a more preferred embodiment, the flow-constricting means comprises a calibrated opening. This opening has different specific configurations, for example, it can be a cylindrical passageway or a tube; it can be a knife-edged orifice; it can be an annular opening; it can be an opening having an effective length to diameter ratio in he range from about 0.1:1 to about 10:1 or higher, and preferably in the order of about 1:1. In a preferred form of this embodiment, the calibrated opening comprises an elongated passageway formed in an insert molded of a wear and corrosion resistant polymeric material such as nylon, polyethylene, or the like.

It is a feature of yet another embodiment herein, to provide sealing means engageable with the workpiece, such sealing means being in the form of a sheet molded of a resiliently deformable sealing material and configured to include therein an array of openings which are delimited by wall means to define a plurality of bounded zones.

In another form of this invention, there is provided a method of holding a workpiece in a selected position on a vacuum apparatus, wherein the vacuum apparatus is provided on one face thereof with sealing means to define a plurality of bounded zones each in flow communication through flow-constricting means with a source of sub-atmospheric pressure, wherein the flow-constricting means is maintained at all times in the same operating condition, irrespective of whether or not the bounded zone is fully covered by at least a part of the workpiece, whereby said flow-constricting means limits flow therethrough to a controlled volume that establishes and maintains subatmospheric pressure in each bounded zone fully covered by part of the workpiece surface. The controlled volume passed by each flow-constricting means is limited to a value in the range from about 0.01 to about 0.02 cubic foot per minute as measured at a pressure differential of 15–27 inches of mercury across such flow-constricting means.

The present inention therefore provided an improved vacuum apparatus by which a workpiece can be held securely against the apparatus, by forces derived from a pressure differential between ambient and a pressure chamber.

There is also provided herein an improved vacuum chuck apparatus which holds a workpiece firmly, but releasably in position, without requiring adjustment of sealing means or the manipulation or actuation of an on-off valve on a surface against the workpiece is held, from one size and/or shape of workpiece to another.

These and other features and advantages of the present invention will become apparent from the following detailed description. That description is now to be read in view of the accompanying drawings. These drawings illustrate by way of example only, some preferred embodiments encompassed by the present invention and which latter is not be limited thereto.

DESCRIPTION OF THE PREFERRED EMBODIMENT

Figure 1:
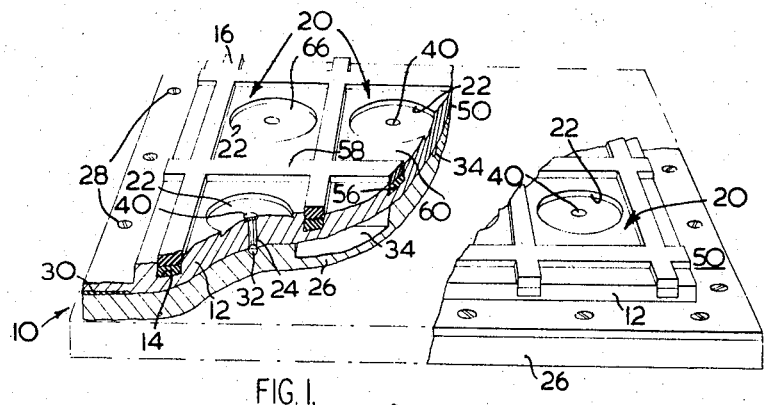
FIG. 1 is a perspective view taken partly in section to show one preferred embodiment encompassed by the present invention.

Turning to the drawings, FIG. 1 illustrates one preferred form of vacuum apparatus embodied by this invention. There, the vacuum apparatus is shown overall at 10. This vacuum apparatus 10 includes a top plate 12 in which there is provided a series of recesses or channels 14 in a grid-like pattern on one surface thereof. The channels 14 are intended to receive and removably retain sealing means in the form of strip material 16. A workpiece is placed against the sealing means 16 which forms a reasonably tight seal therewith. It is seen from FIG. 1 that the strip-like sealing means 16 enclosed regions of the top plate 12, thereby to define a multiplicity of bounded zones. These bounded zones are indicated generally at 20.

The top plate 12 is preferably made of aluminum, although stainless steel or other suitable rigid material in a non-porous form could also be used. The top plate 10 can also be manufactured in a variety of dimensions. A size of approximately 6 inches by 12 inches is frequently used in making a vacuum chuck of the type often found in modern machine shops. To construct a vacuum bed, the top plate 12 would be considerably larger, for instance, ranging in width and/or length from 1 or 2 feet up to many feet in length. Further yet, such a vacuum bed could be made up from modules formed from a series of vacuum apparatus and each involving a top plate 12 which is of a standard size, for instance, of approximately 18 inches by 30 inches in size.

The sealing means 16 are retained in the channels or grooves 14, preferably by friction, by being slightly compressed in those channels. The sealing means 16 can be of one material through out, for instance, a hard synthetic rubber having a durometer hardness of from 40 to 50 on the Shore hardness A scale. The sealing means 16 is thereby capable of being ground. As an alternative, a hard rubber could be bonded with a much softer foam-like rubber which is itself seated in the channels or grooves 14. Either way, the strip-like sealing means 16 will have a resiliency that allows it readily to conform with, and seal the mating surface of a workpiece placed against it. Each fully covered bounded zone forms a pressure chamber. from which air will subsequently be evacuated. Although the surface of the top plate 12 and the surface of a workpiece placed thereon will have surface imperfections, it is often desirable to insure the formation of a pressure chamber of adequate size by providing recesses 22 within each of the bounded zones 20.

Each of the recesses 22 is provided generally centrally of each bounded zone 20. Moreover, each bounded zone 29 opens into a passageway 24 that is provided in the top plate 12.

The top plate 24 is fixedly secured to a base or bottom plate 26 by means of convenient fastening means such as threaded screws 28. Sealing means 30 will often be provided periferally of the top and bottom plates 12 and 26 to insure a substantially airtight seal around the exterior. The bottom plate 26 is preferably formed with a series of grooves or channels 32 which are positioned to be in alignment with the passageway 24 when the top and bottom plate 12 and 26 are secured together. In that way, each of the bounded zones is in flow communication through the passageway 24 and groove 32 with a source of reduced static pressure. This source of reduced static pressure may be in the form of a vacuum chamber or manifold such as that shown at 34. Alternatively, the grooves 32 could each connect with a vacuum header (not shown) which would be connectible directly to a vacuum pump, suction fan or other such source of reduced pressure.

In accordance with this invention, there is provided in each passageway 24 connecting with a bounded zone 20 a flow-constricting means indicated overall at 40. The flow-constricting means 40 is specifically designed to pass only a controlled, calculatable volume of air therethrough. The controlled volume of air through all passageways 24 which leads from the bounded zones 20 has a cumulative total not exceeding to the volumetric capacity of any given vacuum pump, suction fan or the like with which the vacuum apparatus 10 is being used. This controlled, calculatable volume of air passed by the flow-constricting means 40 is sufficient to generate and maintain a substantial sub-atmospheric pressure within each bounded zone 20 that has been converted into a pressure chamber being fully covered by at least a portion of the workpiece placed thereon. The sub-atmosphric pressure is drawn in each pressure chamber irrespective of whether all bounded zones 20 are fully covered, or not. It also allows for the less than absolutely perfect seal formed by sealing means 16 engaging with the mating workpiece surface. Within the context of this invention, it does not matter that some bounded zones 20 are in fact open directly to ambient. The fact remains that flow-constricting means 40 provided in each bounded zone 20 functions to limit the flow of air therethrough to said controlled, calculatable volume which is less than the volumetric capacity of the pump or suction fan being used with the apparatus 10.

Figure 2:
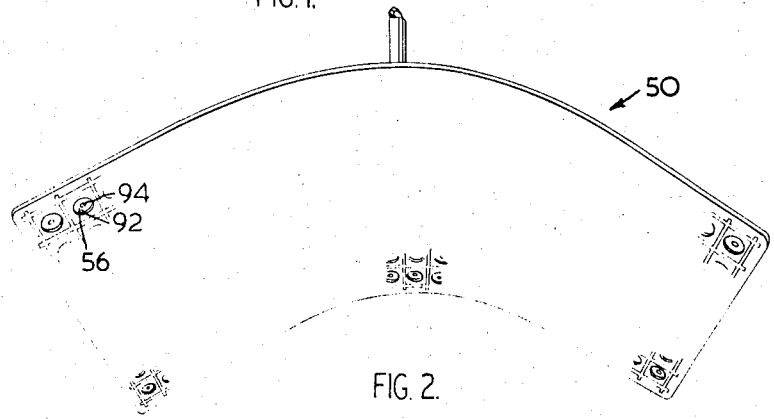
FIG. 2 is also a perspective view showing somewhat schematiclly another form of vacuum apparatus embodied by this invention.

In the embodiments of FIGS. 1 and 2, the flow-constricting means 40 comprises a plug of porous material, preferably a sintered porous stainless steel. Such a porous material has a mean pore size in the range from about 5 to 15 microns, and more preferably from about 5 to 10 microns. The plug of porous material can be approximately circular in plan, having a diameter of approximately one-eighth inch and a thickness of about one-sixteenth inch.

In one experimental version of the vacuum apparatus 10, a vacuum chuck of about 5 inches in width and 10 inches in length was used with a grinding machine. That vacuum chuck had 28 bounded zones 20 and flow-constricting means 40. Each flow-constricting means 40 comprised a plug of porous sintered stainless steel, grade "H", type 316 L. Such material is commercially available. The vacuum manifold or chamber 34 was connected to a vacuum pump of about 4 cubic feet per minute capacity, and capable of producing a vacuum of about 28 inches of mercury, maximum. With the vacuum pump turned on and all 28 bounded zones and flow-constricting means 40 left open to atmosphere, there was a pressure drop, i.e., a loss in vacuum from 28 inches, to 26 inches of mercury. Such a pressure loss has no disadvantageous effects on the operation of this vacuum chuck.

It is noted that other porous material can also be used in place of the sintered stainless steel. The following porous materials, for example, are normally available commercially in the form of sheets: Inconel; Monel; Nickel; Stainless Steel, type 347; Stainless Steel, type 410; Silver; Copper; High Nickel Molybdenum Alloys; and some porous synthetic polymeric materials. It is noted here that the plug of porous material which makes up the flow-constricting means 40 within the context of this invention functions as a flow-restraining or constricting element, and not as a filter medium. The foregoing porous materials have commonly been used as filter material, and this raises an important distinction. It is well known that filter elements are intended to function with a minimum pressure drop across the filter material. In contrast, within the present invention, the plug of porous material which makes up flow-constricting means 40 is deliberately used to provide a maximum pressure drop, while simultaneously allowing a restricted, controlled volume of flow through that material.

As a modification to the embodiment of FIG. 1, the bottom plate 26 having grooves 32 therein could be replaced by a box-like base which constituted a vacuum chamber of a very substantial size as compared to the dimensions of the passageways 24 through top plate 12. Further yet, it is envisaged that both the top and bottom plates 12 and 34 could be resiliently flexible to loosely envelope an article about to be picked up. Such an arrangement is illustrated schematically in FIG. 2. There, a blanket-like surface 50 is formed with sealing means 52 that define a plurality of bounded zones 54. Each bounded zone 54 has flow-constricting means 56 provided therein. Flow constricting means 56 will be identical to the flow-constricting means 40 of the embodiment of FIG. 1, and will be in flow communication with a source of reduced pressure in a manner similar to that of FIG. 1. The vacuum apparatus 50 of FIG. 2 is frequently used to pick up items such as glass in sheet form, rolls of material and so on. Complete structural details of the vacuum lifting apparatus 50 are known, per se, since such devices are being marketed commercially by a number of manufacturers. The structural details of such devices are therefore unnecessary for an understanding of this invention.

Figure 3:
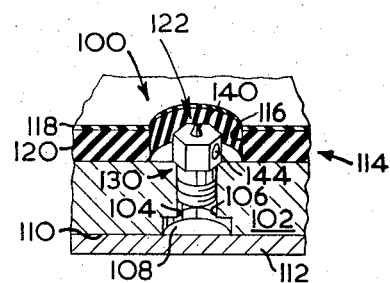
FIG. 3 is a fragmentary elevation view taken partly in cross-section to illustrate some structural features of another preferred embodiment of this invention.
Figures 4, 5:
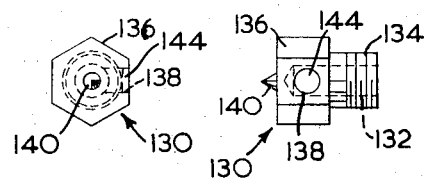
FIGS. 4 and 5 are top plan and side elevation views respectively, of a preferred arrangement for providing the flow-constricting means in the embodiment of FIG. 3.

A preferred form of flow-constricting means is illustrated in FIGS. 3–5 inclusive. FIG. 3 shows a fragmentary section of a vacuum apparatus 100 which might be in the form of a bed or vacuum chuck. In any event, the vacuum apparatus 100 comprises a plate 102 of aluminum, and having a preselected surface area. The top plate 102 is provided with a multiplicity of holes 104 bored or drilled therethrough. Each opening 104 is threaded as shown in 106 and connects with a series of channels or grooves 108 extending longitudinally and laterally of one face 110 of the plate 102. The channels 108 constitute a manifold chamber which is adapted to be connected to a source of vacuum or suction, for instance, by means of a "quick-connect" coupling (not shown). A backing or bottom plate 112 is also provided to form a part of the structural frame which makes up the vacuum apparatus 100. The top plate 102 and bottom plate 112 are secured together, say, by bolts, rivets or other such fastening means.

The face of the top plate 102 opposite the bottom plate 112 is covered with a resilient sheet 114 of sealing material. The sheet 114 is cut, punched, or otherwise apertured to provide an array of openings 116. The sheet 114 is conveniently provided as a laminate, made up of a harder rubber shown at 118 on the outermost surface, and underlaid by a thicker and softer foam-like layer shown at 120. The entire sheet 114 is then adhesively bonded, or otherwise fixedly secured to the aluminum top plate 102. The portions of resilient sheet 114 surrounding the openings 116 defines a multiplicity of bounded zones. As seen from FIG. 3 each bounded zone is indicated at 122 and surrounds one of the threaded openings 104 provided in the top plate 102.

Each threaded opening 104 is adapted to receive a correspondingly threaded plug 130. Each plug 130 has an opening 132 which extends longitudinally, and for convenience, coaxially of the plug 130. This threaded plug 130 is formed with an inner section on which threads 134 are formed, and an outer section 136 shaped as a hexagonal nut whose effective diameter exceeds that of the threaded section 134. A transversely extending blind opening 138 is provided in the expanded outer section 136, to open into the longitudinally extending axial opening 132. For ease of manufacture the blind opening 138 is disposed perpendicular to the axis of the plug 130. The end face of the hexagonal outer section 136 is formed with a projection 140. Again for ease of manufacture, the projection 140 is conveniently made conical in form. Projections having other pointed shapes could also be used. The projections 140 are optional, and are particularly of use in instances when a workpiece is made of a material whose surface can be penetrated by the projection 140 without incurring any undesirable damage to that workpiece. This is the case, for example, if the workpiece constitutes a semi-cylindrical log that is to be cut or sheared into pieces from which wood veneer is being made. If the workpiece is of a material which cannot easily be penetrated, the presence of projections 140 can be omitted.

In accordance with this invention, each of the bounded zones 122 of FIG. 3 has flow-constricting means associated therewith. In the embodiment of FIG. 3–5 such flow-constricting means comprise an insert or plug of a porous material and is shown at 144. This insert 144 is fixedly positioned in the transversely extending opening 138. As before, the insert 144 is preferably made of a porous sintered stainless steel having a mean pore size in the range from about 5 to 15 microns, and more preferably from about 5 to 10 microns. It is seen from FIG. 3 that the hexagonal nut section 136 easily accommodates screwing the threaded plug 130 into the threaded opening 104. The plug 130 is therefore securely seated in that opening 104, and for all intents and purposes, there will be no flow possible between the opening 116, i.e., each bounded zone 122, and passageway 104, except through the flow-constricting insert 144. Positioning of the inert 144 perpendicular to the plane of the bounded zones has the advantage that, for instance, when a piece of lumber is seated against the top plate 102, there is virtually no tendency for inflicting any damage to the porous insert 144. In the context of using the vacuum apparatus 100 for cutting wood veneer, the resilient sheet 114 will be compressed slightly to form a relatively air-tight seal with the surface of the log from which veneer will be cut. The conical projection 140 on each plug member 130 will penetrate slightly into the piece of lumber. This assists the vacuum forces generated to hold the wood securely in place. The procedures involved in cutting pieces of veneer are known in that art, and do not themselves form a part of this invention.

An experimental prototype of vacuum apparatus 100 was constructed to dimensions of about 12 feet long by 2 feet wide. This vacuum apparatus 100 was in that instance provided with 2,750 openings and flow-constricting inserts 144, for use in cutting pieces of wood veneer. The vacuum apparatus 100 was connected to a vacuum pump having a volumetric capacity of 50 c.f.m., with a capability of drawing a vacuum of about 26 to 27 inches of mercury. With all 2,750 openings left directly open to atmosphere through the inserts 144, the vacuum dropped to 15 inches of mercury. A log was initially cut diametrically and planed slightly to provide a relatively smooth surface for seating against the sheet 114 of sealing material. It is expected, however, that due to the resiliency of that sheet 114, a rougly sawed surface would not differ substantially from a planed surface, in respect of the efficiency of the seal formed by that sheet 114 with the cut surface of the log.

The vacuum apparatus 100 was used successfully with a log approximately 8 feet long by 15 inches in diameter placed against the top plate 102 and sealing sheet 114. In that case the minimum vacuum drawn by the 50 c.f.m. pump was 18 inches of mercury. With a larger log of about 11 feet in length and 20 inches in diameter, the minimum vacuum drawn there was 21 inches of mercury. The amount of vacuum or subatmospheric pressure drawn in those two instances was completely adequate to enable pieces of wood to be cut successfully from the log which made up the workpiece in question. Based upon experimental trials that have been carried out using vacuum apparatus according to this invention, a flow-constricting means which passes a flow of approximately 0.01 to about 0.02 cubic foot per minute at a pressure differential in the range from about 15 to 27 inches of mercury, will function satisfactorily.

It is to be noted that vacuum apparatus 100 constructed according to this invention provide significant improvements in the volume production of wood veneer. Previously, waste due to discarding the butt portion which remained of a log from which veneer was being cut, amounted to some 5 percent to 6 percent of the log. That butt portion represented the amount of wood that previously could not be cut into veneer because of the presence of clamping fingers. Using vacuum apparatus 100 according to this invention, this waste has been reduced to about 1 percent. Indeed, the natural porosity of the wood, and the depth of penetration of the projection 140 are the primary factors currently restricting the cutting of the veneer down to a thickness of less than 1/16 to 1/8 inch above the top plate 102 against which the cut log is supported. In reality, an acceptable piece of veneer has indeed been obtained from the last piece of wood, i.e., the butt portion, of the log from which the veneer was being cut.

A more preferred embodiment of the above invention is illustrated in the apparatus of FIGS. 6–13 inclusive. Thus, starting with FIG. 6 there is shown a vacuum apparatus 210 which includes a main plate 212 that is made preferably of sheet metals such as aluminum or steel. A top plate 214 is secured to the main plate 212 by threaded fasteners such as socket head screws 216. A sealing sheet 218 overlies the top plate 214. This sealing sheet 218 is preferably molded from a synthetic elastomeric material such as "NEOPRENE" (a trademark) having good properties of wear and corosion resistance. The sealing sheet 218 is conveniently molded from a synthetic rubber, preferably having a durometer hardness of between 40 and 60 on the Shore hardness A scale.

The molded sealing sheet 218 is provided with a multiplicity of openings 220. Each such opening 220 is defined by side walls 222 that have a bellow-like cross-section and project in one direction from an upper surface 224 of the sealing sheet 218. The outward or free edges of the sidewalls 222 is delimited by a radially inwardly directed bottom flange 226 formed integrally with the sidewalls 222 during molding. The sidewalls and flanges 222 and 226 enclose a region or area of the top plate 214 which can be considered as constituting a "bounded zone". For clarity, each bounded zone formed by the sidewalls, flanges and openings 222, 226 and 220 is identified by the reference numberal 230.

Figure 8:
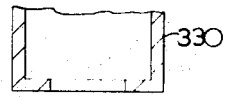
FIG. 8 is an end elevation view taken partly in section to show structural details of the embodiments of FIG. 6.
Figure 8:
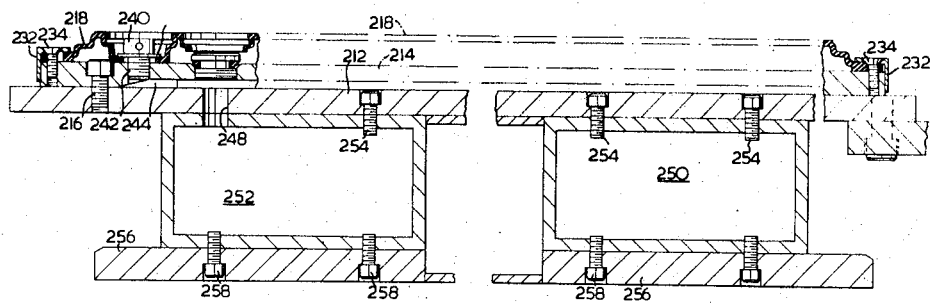

At least one pair of oppositely disposed side edges of sealing sheet 218 are held clamped to the top plate 214 by means of a retainer strip 232 and screw fasteners 234. This is best seen in FIG. 8. The main portion of sealing sheet 218 is held secured by means of flanged washers 236. These flanges washers 236 are received in the central openings 220 of sealing sheet 218, with the flanged portion of each washer being seated on one face of a flange 226. The flanged washer 236 is itself held secured to the top plate 214 by means of a plurality of inserts 240 secured to the former. One insert 240 is disposed in each of the bounded zones 230, and is secured to the top plate 214 by being in an interference fit, or more preferably, threadedly engaged in openings 242 provided in that top plate.

Each opening 242 is in flow communication with a main channel or vacuum header 244 by means of slots or channels 246. The vacuum header 244 and channels 246 are formed in one of the mating faces of the plates 212 and 214. In this instance they are provided in the top plate 214. The vacuum header and channels 244 and 246 are arranged in a grid-like pattern to interconnect each of the openings 242 through a passageway 248 to top and bottom vacuum manifolds 250 and 252.

The vacuum manifolds 250 and 252 are constructed preferably of extruded alimunum tubing, for instance, 2 inches by 4 inches in cross-section with a wall thickness of about 3/16 of an inch. The main plate 212 is secured to the vacuum manifolds 250 and 252 by screw fasteners 254, for instance, socket head cap screws. The vacuum manifolds 250 and 252 in turn are connected to sole strips 256 by screws or other such threaded fasteners 258. Such an arrangement gives structural rigidity to the entire assembly.

Figure 6:
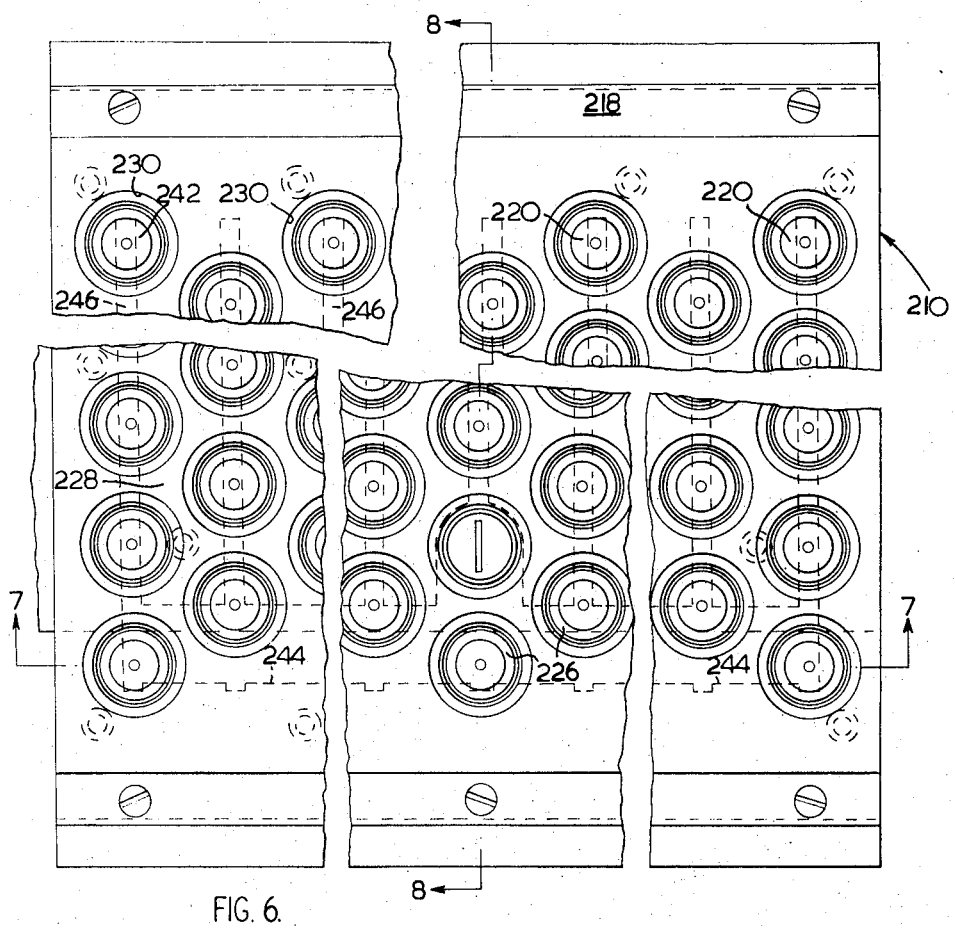
FIG. 6 is a plan view of yet another preferred form of vacuum apparatus embodied by this invention.
Figure 7:
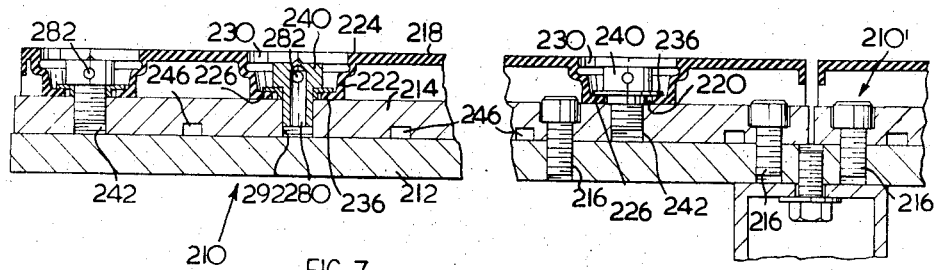
FIG. 7 is a side elevation view of the apparatus of FIG. 6.

It will be evident from FIG. 6 that the vacuum apparatus 210 is adaptable to being made up to virtually any desired size. For convenience it is preferable to construct a vacuum apparatus 210 from modules each of which is a standard size. Such modules can, for instance, be about 18 inches by 27 inches; or 18 inches by 30 inches in size. To provide a vacuum bed of any predetermined surface area, one can easily determine how many modules are required to to provide that area.

Figure 9:
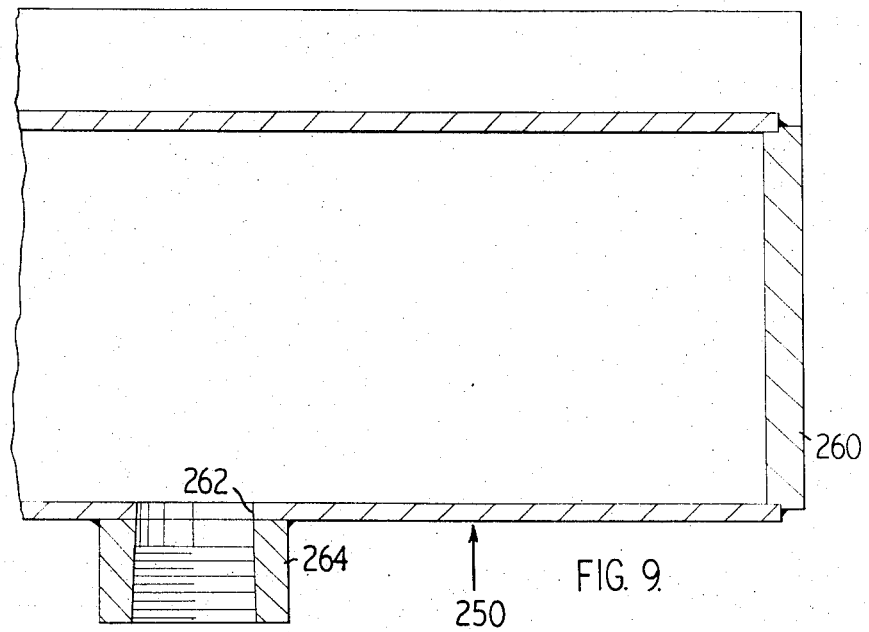
FIG. 9 is a side elevation view taken in section along line 9—9 of FIG. 6 to show some details of the top tube of the apparatus of FIG. 6.
Figure 10:
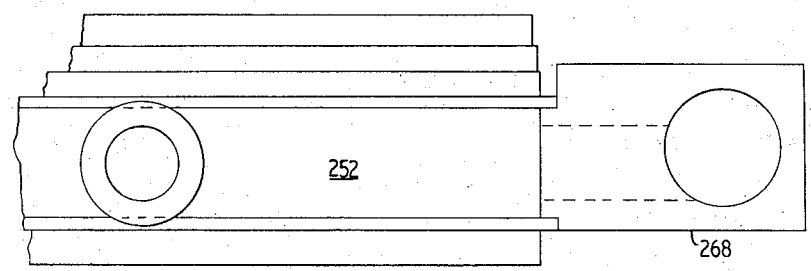
FIG. 10 is a top plan view of the bottom tube of the embodiment of FIG. 6.
Figure 11:
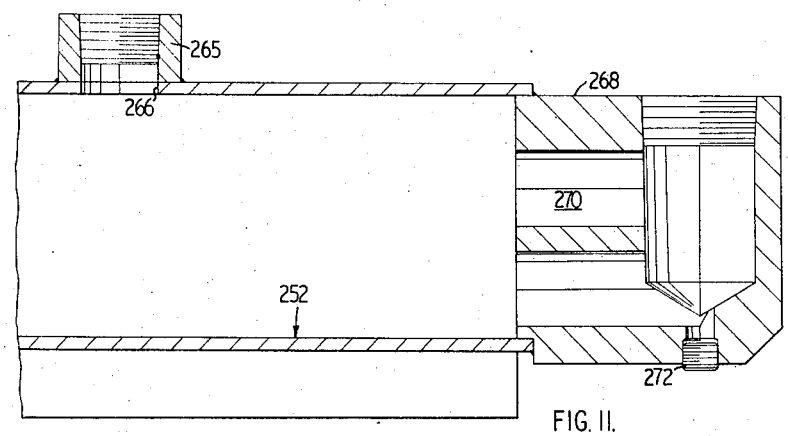
FIG. 11 is a side elevation view taken partly in section to show further details of the bottom tube of FIG. 10.

FIGS. 9–11 show one convenient method for interconnecting the vacuum manifolds 250 and 252. In FIG. 9, a portion of the top vacuum manifold 250 is shown having a cover plate 260 welded or otherwise sealed to the end thereof. An opening 262 is formed in one side wall of the tubular manifold 250, and includes an internally threaded sleeve member 264 connected to that opening. A conventional "quick-connect" coupling (not shown) is intended to be coupled with the sleeve 264.

FIGS. 10 and 11 show the bottom vacuum manifold 252 having an opening 266 in one wall thereof. That opening 266 also has an internally threaded spigot or sleeve member 265 welded thereto. A pneumatic hose is normally used to interconnect the two members 264 and 265 thus placing vacuum manifolds 250 and 252 in flow communication with one another. For convenience, one open end of the vacuum manifold 252 has a connector 268 secured thereto, by welding or other means of sealed engagement. The connector 268 is itself provided with internal passageways 270. These passageways 270 are adapted to be connected to a vacuum pump, suction fan or such source of reduced pressure. This is normally done by another "quick-connect" pneumatic hose arrangement (not shown). If required, the connector 268 is provided with a sealable drain plug 272 which is used for cleaing purposes, or for taking test readings of the vacuum drawn in the manifold chambers 250 and 252, or the like.

Returning again to FIGS. 6–8, it is seen that each bounded zone 230 contains an insert member 240. For convenience, the insert 240 is generally similar in structure to the threaded plug member 130 of FIGS. 3–5. Thus, in the embodiment of FIGS. 6–8, the insert member 240 comprises a flow-constricting means within the context of this invention. Each insert member 240 has an axially extending bore hole 280 which connects with a transversely oriented opening 282. The opening 282 can be provided with flow-constricting means in the form of an insert or plug of sintered material in the manner of the embodiment of FIGS. 1–5. Preferably, however, the opening 282 is constructed as a "calibrated opening" which can have one of a number of different specific configurations, to be discussed below.

It will in any event be seen that there is an open flow path for air from ambient through the calibrated opening 282, the axial bore hole 280, and opening 242 through channels 246 and vacuum headers 244 and openings 248 in the main plate 212 through to vacuum manifolds 250 and 252.

When a workpiece is placed upon the vacuum apparatus 210, at least a portion of that piece will cover one or more of the bounded zones 230. Other bounded zones 230 will be either partially covered, or be left completely uncovered. Those bounded zones 230 which are wholly covered will not form pressure chambers in which a vacuum is drawn via the flow path mentioned earlier.

In accordance with this invention, however, each calibrated opening 282 restricts flow from each bounded zones 230, whether covered or not, to a controlled calculatable volume in the range from about 0.01 to about 0.02 cubic foot per minute. The calibrated opening 282 preferably has an effective diameter in the range from 0.001 inch to about 0.010 inch (0.00254 to 0.0254 cm.). The calibrated opening 282 can be disposed in one of the axial or transverse openings provided in the threaded insert member 240, or even in passageway 242 formed in the top plate 214. It is highly pereferable, however, to provide the calibrated opening which constitites the flow-constricting means of this invention in a separate plug or insert 290 which is shown in FIG. 12.

The plug or insert 290 is formed preferably by injection molding a heat softenable polymeric material such as nylon 11, polyethylene, or other specific forms of nylon. Further yet, other heat softenable polymeric materials having similar properties of wear and corrosion resistance could also be used.

Figures 12, 13:
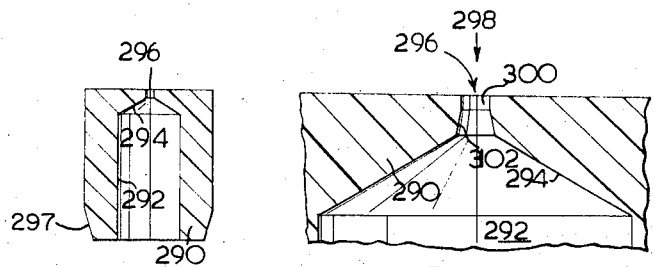
FIG. 12 is a side elevation view taken in section centrally of a plastic insert embodied in the apparatus of this invention.
FIGS. 13–16 inclusive are also side elevation views taken in central cross-section to show schematically a number of specific configurations which the calibrated opening version of the flow-constricting means herein, can take.

With reference to FIG. 12, the port or insert 290 is generally of a cylindrical cross-section, and has a generally cylindrical inner opening 292. One end of that inner opening 292 is tapered as shown at 294, and communicates with a calibrated aperture or passageway 296. The cross-sectional area of the opening 292 is quite large as compared to the area of the calibrated passage 296. The latter has an effective diameter in the order of 0.001 to 0.010 inch, as mentioned earlier. Furthermore, the sides of that calibrated passage 296 will, for instance, be in the order of one hundred times smaller than the cross-sectional area of the insert 290 in which it is formed.

The size differential between the plug or insert 290 and calibrated passage 296 is of some significance. The insert 290 is fitted preferably into the transverse opening 282 of the threaded plug member 240 by an interference fit. Thus, the end of the insert 290 opposite the calibrated opening 296 is chamfered as shown at 297. The amount of interference between the outside diameter of insert 290 and the inside diameter of the transverse opening 282 will generally be in the order of about 0.0015 inch. The inherent deformability of the material from which the insert 290 is made will easily absorb the compression required to accommodate such an interference fit, without causing deformation or blockage of the calibrated opening 296.

It has previously been mentioned that the calibrated opening envisaged herein has many specific configurations. A preferred embodiment is illustrated on a greatly enlarged scale in FIG. 13. There, a portion of the plug or insert 290 is seen along with the tapered end 294 of the central opening 292. The calibrated passage 296 which leads from the tapered end of the central opening 292 itself comprises two portions. An arrow 298 illustrates in FIG. 13 the normal direction of flow of the controlled volume of air through calibrated passage 296. With reference to that direction of flow, the calibrated passage 296 has an upstream portion 300 and a downstream portion 302. The upstream portion 300 is cylindrical and has a constant cross-sectional area. The downstream portion 302 is tapered, and its cross-sectional area increases uniformly in the direction of flow 298.

Figures 14, 15:
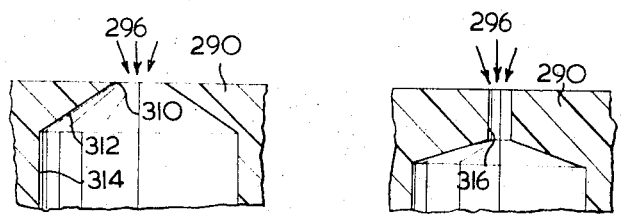

In FIG. 14, the calibrated passage 296 is in the form of knife-edged orifice 310 which opens into a tapered section 312 whose cross-sectional area increases uniformly in the direction of flow, ending at the central opening 314. The portions 312 and 314 in FIG. 14 correspond to the parts indentified at 292 and 294 in FIGS. 12 and 13.

In FIG. 15, the calibrated passage 296 is in the form of a cylindrical passageway 316. The passageway 316 has a ratio of effective diameter to length in the range of about 0.1:1 up to approximately 10:1; or higher. As the actual diameter of the cylindrical passageway 316 approaches 0.001 inch, it is not necessary to have a large length dimension in order to constrict the flow of air effectively. However, as the diameter of the passageway 316 increases toward a figure of about 0.010 inch, it becomes appropriate to also increase the length dimension for that passageway, to a size which limits flow therethrough to a value in the range from about 0.01 to about 0.02 cubic foot per minute. As mentioned earlier such a flow rate is measured under test conditions in which a vacuum pump having a capability of drawing 27 inches of vacuum is connected to one side of the calibrated opening 296; while the other side of that opening is at atmospheric conditions. It will be apparent to those knowledgeable in this art that as the actual pressure differential across the calibrated opening 296 varies, so too, will volume flow rate of air passed by that opening. It has been determined under test conditions that a flow rate as low as 0.01 cubic foot per minute at a pressure differential of approximately 15 inches of mercury will develop and sustain a vacuum within the pressure chamber formed by completely covering one or more of the bounded zones 230, sufficient to operate the vacuum apparatus 210 satisfactorily.

Figure 16:
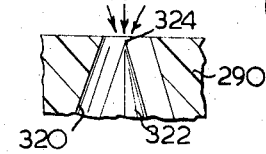

It is further envisaged within the spirit of this invention that calibrated opening 296 can have an annular cross-section, as illustrated in FIG. 16. There a tapered passageway 320 is provided in the insert 290. The tapered passageway 320 is shown in part only, and connects to a much larger opening comparable to the opening 292 of FIGS. 12 and 13. The tapered passageway 320 of FIG. 16 contains a torpedo or needle element 322. That element 322 is supported from suitable struts (not shown) within the central opening of the insert 290. This torpedo member 322 would thus be supported with its leading end 324 located in a preselected position relative to the plane of the surface of the insert 290 surrounding the tapered passageway 320. Thus, the leading end or point 324 could be beyond, be coincident with, or be slightly recessed relative to the plane of the surface of insert 290. A selection will thus be made in positioning the point or leading end 324 of the torpedo 322, to restrict flow through the opening 296 to a value in the range of about 0.01 to about 0.02 cubic foot per minute. It is also possible to have the torpedo or needle member 322 reciprocally movable to provide for cleaning of the calibrated opening 296, as required.

It is contemplated that in most instances cleaning of the calibrated opening 296 will be required from time to time. This is easily done by applying a super-atmospheric pressure to the manifold chambers 250 and 252. There will thus be a reverse flow generated through the calibrated openings 296 for cleaning thereof.

It is important to recognize that according to this invention, each of the calibrated openings which make up the flow constricting means herein, remains continuously in one conditional motive operation. As shown herein the calibrated openings remain fully opened at all times, either to atmosphere or into a pressure chamber formed when a bounded zone in which it us located has been fully covered by at least a portion of the workpiece. Regardless of the region or zone with which the calibrated opening is in flow communication, that opening will pass only the control volume of air therethrough. This control volume of air is sufficient to generate and maintain sub-atmospheric pressure conditions within each covered bounded zone. Because of the function served by the flow constricting means, i.e., calibrated openings, those bounded zones which open to atmosphere will not affect adversely the establishment of sub-atmospheric pressure in the fully covered bounded zones. Thus, and contrary to practices in prior art, we have found that certain benefits are derived from maintaining constantly a capability for flow through each bounded zones whether it is covered or not, so long as that flow is limited to a control, calculatable volume, preferably by a calibrated opening that limits the flow to approximately 0.01 to about 0.02 cubic foot per minute.

The apparatus of this invention thereby eliminates the necessity attendant with prior art devices of either reorienting any sealing strips placed in grooves or channels, and/or by manipulating or actuating at a valve arrangement effectively to shut off flow through pressure chambers or bounded zones not fully covered by the workpiece. The elimination of a considerable amount of "down-time" is therefore derived by using the present invention for holding workpieces in position, especially where successive workpieces are of different shapes and/or sizes. It will also be seen from the description above that vacuum apparatus embodying this invention has considerable versatility in use and modes of application. The surface against which a workpiece is placed can be either rigid, or flexible and resiliently deformable in the form of a blanket. Further yet, calibrated openings such as those described herein can be provided in tubular rolls used to convey sheet material, for instance, in various printing processes.

Accordingly, vacuum apparatus embodied by this invention provides many advantages and benefits not readily obtainable with prior art structures. The foregoing disclosure has described some preferred embodiments of this invention. Moreover, some modifications and alternatives have also been suggested. It is therefore contemplated within the spirit of this invention to encompass all such changes and modifications as would be apparent knowledgeable in this art, and which fall within the scope of the claims below.

I claim:

1. A planar vacuum apparatus for holding a workpiece thereon in a selected position comprising
   a base surface;
   a sheet of resiliently deformable material detachably secured to the base surface having a surface adapted to support said workpiece and being provided with an array of openings therein;
   the openings in the sheet each being defined by a bellow-like wall which, collectively, space said deformable sheet above the base surface, said bellow-like walls defining with said openings a plurality of bounded zones;
   each bounded zone being connected to a source of sub-atmosphere pressure;
   and a plurality of flow constricting means in the base surface and associated with each opening and bounded zone to limit flow therethrough to a controlled volume;
   the volume passed by each opening having an accumulated total volume not exceeding the volumetric capacity of the source.

2. Apparatus according to claim 1 wherein the flow constricting means in the base surface comprises a plug member for seated engagement in the base member, said plug having a central axis and a flow passage extending coaxially therethrough, and an apertured insert in said plug providing communication between the flow passage and the bounded zone, said insert being positioned normal to the flow passage and substantially parallel to the surface of the deformable sheet.

3. The apparatus of claim 2, wherein said plug member includes a projecting element on its upper end adapted to frictionally engage the surface of a workpiece which covers a bounded zone.

4. Apparatus according to claim 2, wherein the insert has a calibrated opening in the range from about 0.001 to 0.010 inch.

5. The apparatus defined in claim 4, wherein the calibrated opening includes a tapered section upstream of the flow and whose cross-section increases in size in the direction of flow of said controlled volume, and a downstream straight section whose cross-section is constant and equal to the minimum cross-section of the tapered section.

6. Apparatus according to claim 2, wherein the bellow-like wall defining each bounded zone is higher than the plug member whereby the surface of the deformable sheet lies above the upper surface of the plug.

7. A workpiece supporting, resiliently deformable sheet for mounting on the base surface of a planar vacuum apparatus of the type having a plurality of flow-constricting plugs secured in and projecting above the base surface, said sheet having a planar upper surface and a plurality of openings therein to correspond to the number and placement of plugs on the vacuum apparatus; and a flexible bellows-like wall on the back surface of the sheet concentric with each opening in the sheet and extending outwardly thereof to surround said plugs when the sheet is mounted on a vacuum apparatus, the height of the bellows-like walls being greater than that of the plugs when the said walls are in an uncompressed state.

* * * * *